United States Patent [19]

Watanabe et al.

[11] Patent Number: 5,251,603
[45] Date of Patent: Oct. 12, 1993

[54] FUEL COOLING SYSTEM FOR MOTORVEHICLES

[75] Inventors: Hideo Watanabe, Wako; Noboru Sagara, Ibaraki; Hideki Kimura, Furukawa, all of Japan

[73] Assignees: Sanoh Kogyo Kabushiki Kaisha; Honda Giken Kogyo, both of Tokyo, Japan

[21] Appl. No.: 887,755

[22] Filed: May 27, 1992

[30] Foreign Application Priority Data

May 29, 1991 [JP] Japan ............... 3-39384[U]

[51] Int. Cl.$^5$ .............................. F02M 15/00
[52] U.S. Cl. ......................... 123/541; 165/154
[58] Field of Search .................. 165/154; 123/541

[56] References Cited

U.S. PATENT DOCUMENTS

| 1,903,387 | 4/1933 | Howe | 165/154 |
| 2,120,764 | 6/1938 | Newton | 165/154 |
| 2,254,587 | 9/1941 | Williams | 165/154 |
| 4,059,882 | 11/1977 | Wunder | 165/154 |
| 4,938,036 | 7/1990 | Hodgkins et al. | 165/154 |
| 5,062,474 | 11/1991 | Joshi | 165/154 |

FOREIGN PATENT DOCUMENTS 59-112189 6/1984 Japan ..................... 165/154
3-43653 2/1991 Japan .

Primary Examiner—Noah P. Kamen
Attorney, Agent, or Firm—Beveridge, DeGrandi, Weilacher & Young

[57] ABSTRACT

A fuel cooling system for a motorvehicle has a fuel tank for supplying fuel to a motorvehicle engine. The system further includes a refrigerant evaporator and a compressor of a refrigeration system for air conditioning, and a heat exchanger provided between a fuel pipe and an evaporated refrigerant pipe. The heat exchanger is made up of coaxial inner and outer tubes and, for example, helical heat transfer fins contained in an annular space between the inner and outer tubes. With this construction, the fuel flowing through a fuel return pipe extending between the engine and the fuel tank is caused to flow through the annular space between the inner and outer tubes. On the other hand, evaporated low temperature refrigerant is caused to flow through the inside of the inner tube of the heat exchanger. The inner tube has secured therein, heat exchange fins, for example, of the type extending longitudinally thereof and having wavy transverse cross section. The fuel and the refrigerant exchange heat through the inner tube, whereby the fuel is cooled effectively.

3 Claims, 4 Drawing Sheets

FUEL COOLING SYSTEM FOR MOTORVEHICLES

BACKGROUND OF THE INVENTION

This invention relates to a fuel cooling system for a motorvehicle, capable of preventing temperature rise of gasoline or fuel in the fuel tank of the motorvehicle.

The gasoline or fuel supply pipes and the fuel return pipe for the engine of automobiles are heated due to temperature rise of the engine compartment or to radiation heat from the road surface so that the fuel temperature in the pipes is caused to rise, which in turn causes temperature rise of the fuel in the fuel tank. As a consequence, vapor of the fuel is generated in the fuel tank, which vapor is adsorbed by the canister containing activated carbon for preventing leakage of the fuel vapor into the atmosphere.

In recent years the density of parts in the engine compartment has become high and therefore the fuel temperature tends to increase so that where the external temperature is high, a large quantity of fuel vapor is generated to such a degree that the quantity of the generated fuel vapor exceeds the adsorption capacity of the canister. Thus, there arises a dangerous condition of the fuel vapor being discharged to the outside to a greater degree. Furthermore, due to the evaporation of the fuel, a vapor locking phenomenon occurs in the fuel pipes. This phenomenon can be prevented only by decreasing the temperature of the fuel.

To decrease the fuel temperature it has been a practice to cool the fuel in the pipes by low temperature refrigerant flowing through a refrigerant return pipe to the compressor of the refrigeration system for the air conditioning of the motorvehicle. For carrying out this cooling, a heat exchanger is provided between the fuel pipe and the refrigerant return pipe as disclosed in Japanese Patent Appln. Laid-open No. HEI 3-43,653.

The heat exchanger of the prior art described above has a construction wherein a fuel flow tube and a refrigerant flow tube are concentrically disposed and radial heat transfer fins are fixed in these tubes. Those fins are parallel radial fins extending transversely to the flow paths in the tubes so that the flow resistance in the tube is too large to ensure a smooth flow of the fuel and refrigerant while preventing temperature rise of the fuel due to the -temperature rise in the modern engine compartment caused by high density of parts therein and due to the provision of an electronic fuel injection device. Flow resistance to the flow of the refrigerant is especially objectionable.

SUMMARY OF THE INVENTION

It is an object of this invention to provide a novel fuel cooling system for motorvehicles capable of effectively cooling the fuel without unduly large flow resistance.

A more specific object of this invention is to provide a novel fuel cooling system which is capable of ensuring proper flows of the fuel and refrigerant while preventing temperature rise of the fuel in a fuel tank and preventing evaporation of the fuel and which has a compact construction.

According to this invention, there is provided a fuel cooling system for a motorvehicle wherein a head exchanger is provided between a fuel return pipe for returning fuel f rom an engine to a fuel tank and a refrigerant pipe for passing a refrigerant therethrough, characterized in that the heat exchanger comprises an inner tube inserted in one of the refrigerant pipe and the fuel return pipe to act as an inner f low passage; an outer tube encompassing the inner tube so as to define an annular space therebetween; connecting means for connecting the annular space in the outer tube with the other of the refrigerant pipe and the fuel return pipe such that the space acts as an outer flow massage; inner heat transfer fin means secured in said inner flow passage; outer heat transfer fin means secured in said outer flow passage; and at least one of said inner and outer heat transfer fin means extending longitudinally of said tubes, to thereby reduce flow resistance while enabling effective heat exchange between the fuel and the refrigerant.

With the construction set forth above, fuel flowing through the fuel return pipe from the engine to the fuel tank is caused to pass through the heat exchanger in which the fuel is cooled by low temperature refrigerant. The heat transfer fin means extending longitudinally of the tubes enables effecvtive heat exchange with reduced flow resistance.

DESCRIPTION OF THE PREFERRED EMBODIMENTS

Figure 1:
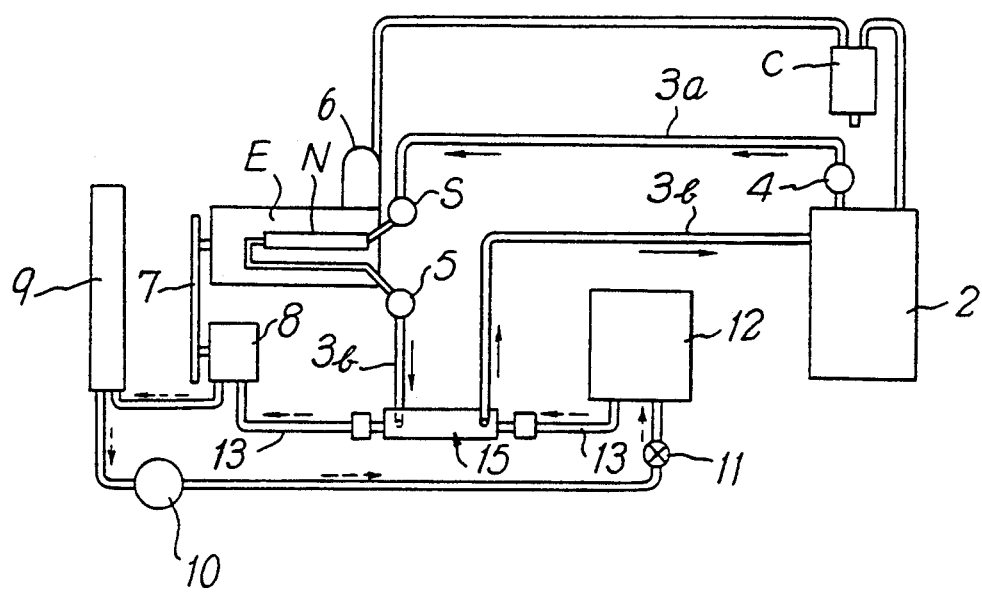
FIG. 1 shows a pipeline circuit of the fuel cooling system for motorvehicles according to this invention.

In FIG. 1, an engine E of a motorvehicle is connected to a fuel tank 2 to be supplied with gasoline or fuel therefrom by a pump 4 through a fuel supply pipe 3a and a strainer S. The fuel supplied is injected into the engine E by an injector N. Fuel which has not been injected by the injector N returns to the fuel tank 2 via a fuel return pipe 3b including a pressure regulator 5. A known canister C is connected to the fuel tank 2 for absorbing fuel vapor formed in the fuel tank 2. The canister C is communicatively connected to a known throttle body 6.

Power is taken out f rom the engine E through a power transmission device 7 to a refrigerant compressor 8 of a refrigerating system for air conditioning the motor vehicle. The refrigerating system is made up of the compressor 8, a condensor 9, a refrigerant reservoir 10, a refrigerant expansion valve 11 and an evaporator 12. A refrigerant return pipe 13 is connected between the evaporator 12 and the compressor 8 so that the refrigerant flows as indicated by broken line arrows.

A heat exchanger 15 is provided between the refrigerant return pipe 13 and the fuel return pipe 3b for exchanging heat between these pipes. Provision of such heat exchanger has been known as disclosed by Japanese Patent Laid Open Publication No. HEI 3-43,653. According to this invention, the heat exchanger 15 is constructed as shown in FIGS. 2 through 8.

Figure 2:
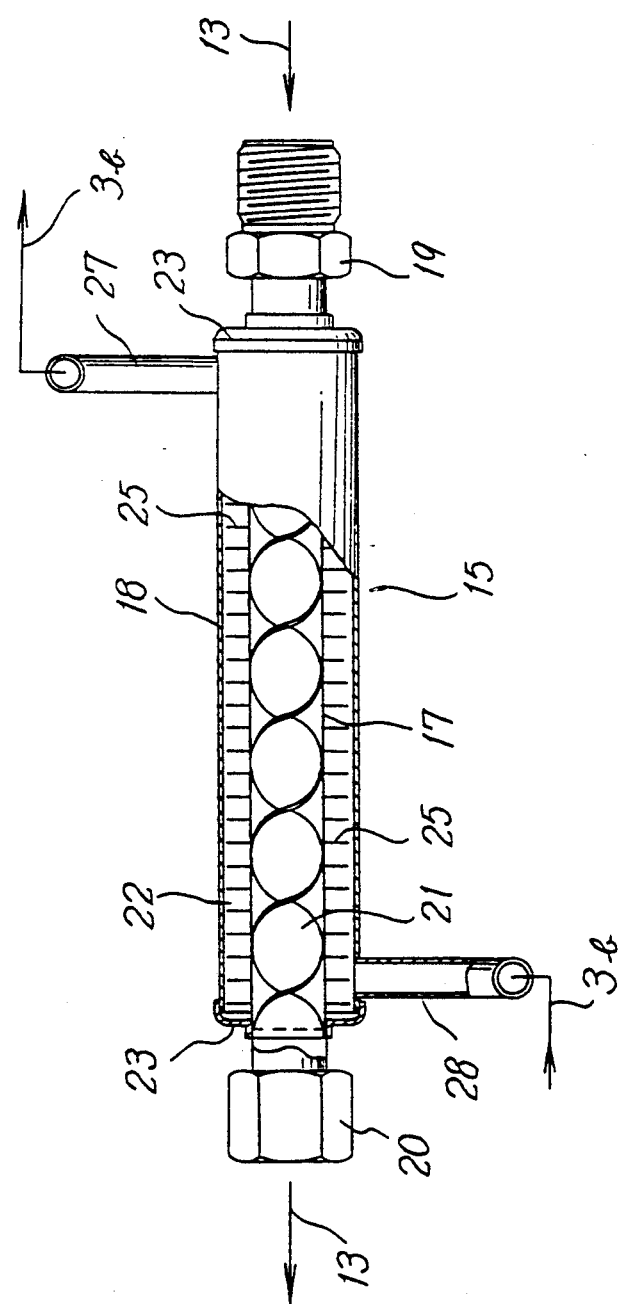
FIG. 2 is an enlarged view, partly in section, showing a heat exchanger of the fuel cooling system shown in FIG. 1.
Figure 3:
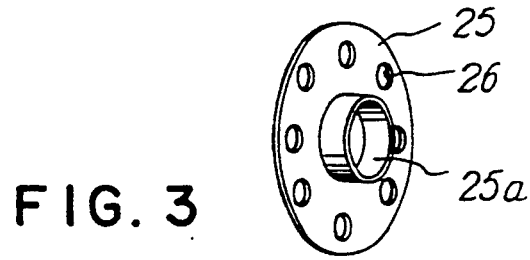
FIG. 3 is a perspective view showing heat transfer fins shown in FIG. 2.
Figure 4:
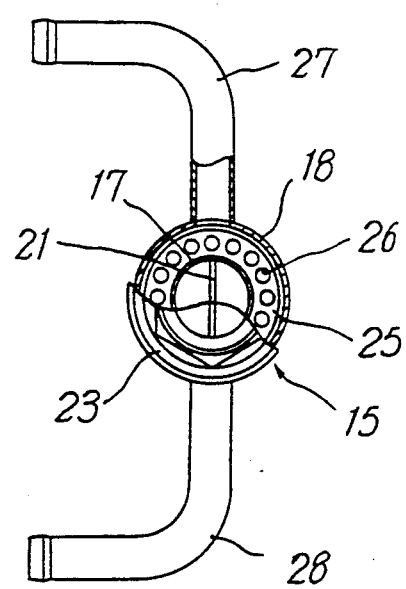
FIG. 4 is an end view, partly in section, of the heat exchanger of the fuel cooling system shown in FIG. 2.

FIGS. 2 to 4 show a first embodiment of this invention. As shown in FIG. 2, the heat exchanger 15 is inserted in the refrigerant return pipe 13 and comprises an inner tube 17 acting as a refrigerant passage, and an outer tube 18 concentrically covering the inner tube 17. Both ends of the inner tube 17 are connected to the refrigerant return pipe 13 through couplings 19 and 20. A helical plate 21 formed by twisting a flat strip is inserted into the inner tube 17 and fixedly secured thereto. It will be noted that the helical plate 21 extends longitudinally and radially of the tube 17.

An elongated annular space 22 is defined between the inner tube 17 and the outer tube 18 and the opposite ends of this space 22 are closed by end plates 23. Annular heat transfer fins 25 are secured in axially spaced relationship to the outer surface of the inner tube 17. As shown in FIG. 3, each heat transfer fin 25 has an annular flange 25a secured to the outer surface of the inner tube 17 and a number of small openings 26 as also shown in FIG. 4. To both ends of the outer tube 18 are joined connecting pipes 27 and 28 which are communicatively connected to the fuel return pipe 3b.

The first embodiment described above operates as follows.

As the engine E is operated, the fuel in the fuel tank 2 is sent to the engine E by the pump 4 via the fuel supply pipe 3a, and a quantity of the fuel which has not been injected is returned to the fuel tank 2 via the fuel return pipe 3b. When the refrigerating system is operated, the refrigerant compressed by the compressor 8 flows through the condenser 9, reservoir 10, expansion valve 11, evaporator 12 and heat exchanger 15 to perform a refrigeration cycle. Low temperature refrigerant evaporated in the evaporator 12, on the way of returning back to the compressor 8 via the refrigerant return pipe 13, undergoes heat exchange with the fuel flowing in the fuel return pipe 3b in the heat exchanger 15, thereby cooling the fuel.

In the heat exchanger 15, evaporated low temperature refrigerant flows through the inner tube 17, while filling the same. At this time, the refrigerant flows while being twisted by the helical plate 21, thereby creating a turbulent flow which improves heat transmission. It will be noted that the helical plate 21 gives only a small flow resistance to the refrigerant. The fuel flowing through the fuel return pipe 3b flows in the space 22 between the inner and outer tubes 17 and 18 so as to be efficiently cooled by the refrigerant due to the increase in heat transfer area caused by the heat transfer fins 25. Many small openings 26 of the heat transfer fins 25 serve to increase the cooling effect on the fuel and to lower the pressure loss. The fuel which has thus effectively cooled as above is returned into the fuel tank 2, thus preventing temperature rise of the fuel in the tank 2. Due to the efficient heat transfer described above, it is possible to compactly construct the heat exchanger 15. The helical plate 21 may be provided in the outer tube instead of the inner tube. For cooling the fuel, any cooling medium other than the refrigerant may be used. The term "refrigerant" includes also such cooling medium.

Figure 5:
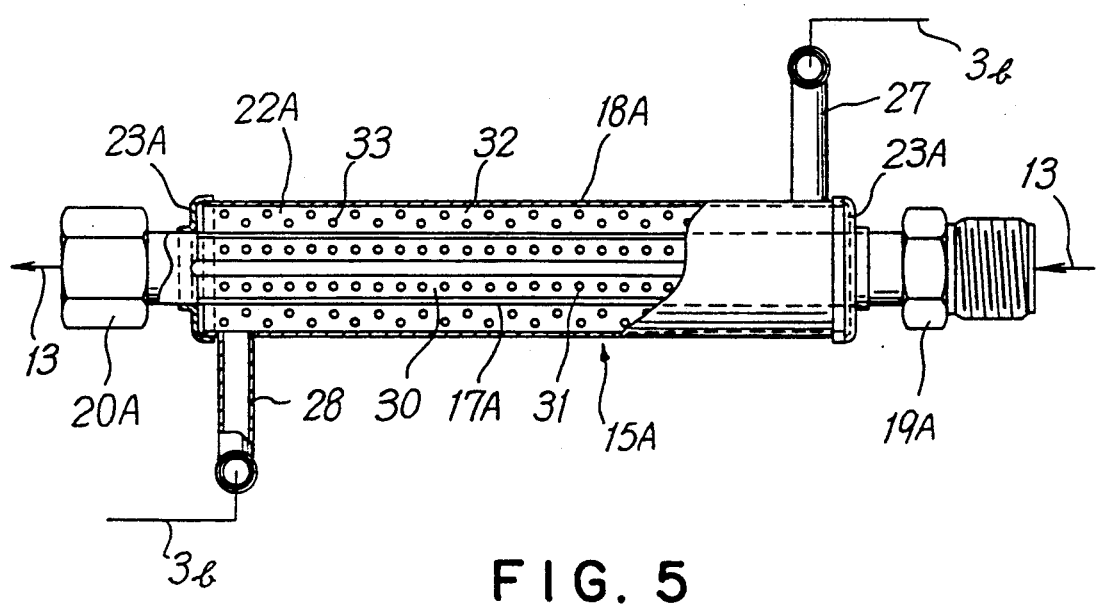
FIG. 5 is a side view, partly in section, showing a modified heat exchanger.
Figure 6:
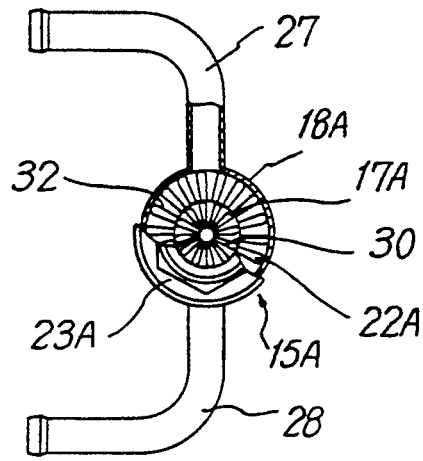
FIG. 6 is an end view, partly in section, showing the heat exchanger shown in FIG. 5.

FIG. 5 and 6 show a second embodiment of this invention. A heat exchanger 15A shown in FIG. 5 is constituted by an inner tube 17A inserted in the refrigerant return pipe 13 for providing a refrigerant passage, and an outer tube 18A concentrically surrounding the inner tube 17A. Both ends of the inner tube 17A are connected to the refrigerant return pipe 13 through couplings 19A and 20A. First heat transfer fins 30 are inserted into the inner tube 17A and secured to the inner surface thereof. The heat transfer fins 30 are disposed over the entire length of the inner tube 17A. As shown in FIG. 6, the fins 30 have a wavy cross-sectional configuration extending peripherally of the inner surface of the inner tube 17A. More specifically, heat transfer fins 30 are produced by forming a thin metal plate into a wavy or corrugated configuration and then rounding the wavy plate into a cylindrical shape. By press-fitting the wavy cylindrical plate into the inner tube 17A, the heat transfer fins 30 are fixedly secured. The heat transfer fins 30 are formed with a number of small openings 31.

Between the inner tube 17A and outer tube 18A is defined an annular space 22A, both ends thereof being closed by end plates 23A. Second heat transfer fins 32 are attached to the outer surface of the inner tube 17A over the entire length of the space 22A. The second heat transfer fins 32 are of the same wavy construction as the first heat transfer fins 30. More specifically, the second heat transfer fins 32 are formed by cylindrically rounding a wavy plate. Over the entire length of the heat transfer fins 32 are formed a number of small openings 33.

The operation of the second embodiment is similar to that of the first embodiment. Since in the second embodiment, the first and second heat transfer fins 30 and 32 are arranged such that the spaces between adjoining waves extend in the longitudinal direction of the heat exchanger 15A, both the refrigerant and fuel are allowed to flow without being subjected to large flow resistance, whereby pressure loss is small. On the other hand, since the wavy heat transfer fins 30 and 32 have a large heat transfer area, the heat transfer coefficient is improved so that the fuel is cooled efficiently. Furthermore, by the provision of numerous small openings 31 and 33, heat transfer is further improved.

Figure 7:
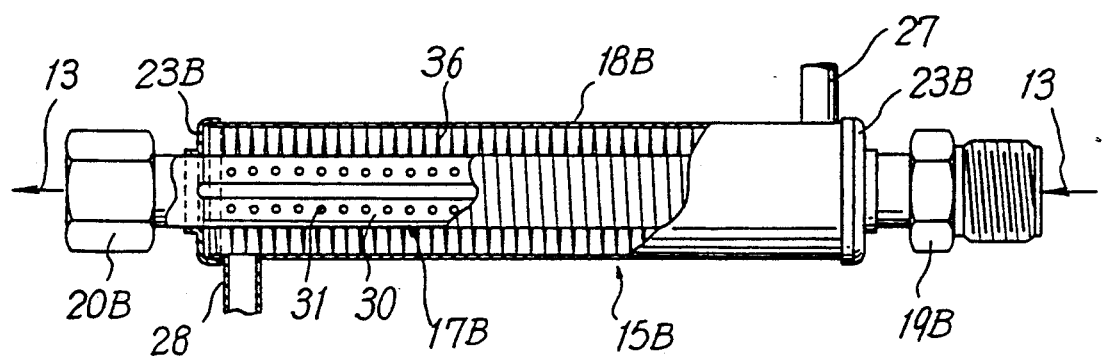
FIG. 7 is a side view, partly in section, showing a further modified heat exchanger.
Figure 8:
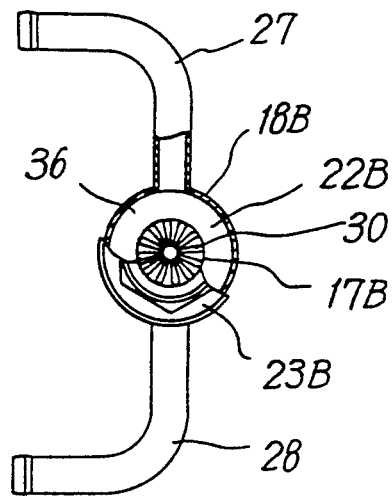
FIG. 8 is an end view, partly in section, showing the heat exchanger shown in FIG. 7.

FIGS. 7 and 8 show a third embodiment of this invention. The heat exchanger 15B of this embodiment differs from that of the second embodiment shown in FIGS. 5 and 6 only in the construction of the heat transfer fins 36 installed between the inner tube 17B and the outer tube 18B. In this embodiment, the heat transfer fins 36 are helical fins and are secured to the outer surface of the inner tube 17B. As shown in FIGS. 7 and 8, heat transfer fins 36 can be formed by helically wrapping a strip about the exterior of the inner tube. Also, FIGS. 7 and 8 show the heat transfer fins extending between and into contact with the inner and outer tubes. Other parts equivalent to those of the second embodiment are designated by changing the subscript A after the numeral (FIGS. 5 and 6) to B.

In this embodiment, the fuel passing through the annular space 22B flows while helically revolving along the heat transfer fins 36 so that the heat transfer performance is greatly improved. The function of the refrigerant flowing through the inner cylinder 17B in the same as that of the embodiment shown in FIGS. 5 and 6.

Generally, a refrigerant circuit of a refrigeration cycle presents a problem of pressure loss. Therefore, it is desirable to use axial fins 30 having low pressure loss. On the otherhand, in a fuel supply conduit, pressure loss does not cause any substantial problem. For this reason, even though the helical heat transfer fins 30 are used in the space 22B as shown in FIG. 7, there is no problem. Rather, this construction is desirable because the heat transfer coefficient is increased.

In either one of the second and third embodiments, it is possible to change the flow to the counter-flow type.

As described above, according to this invention, the heat exchanger utilizes heat transfer fins extending longitudinally of the tubes of the heat exchanger. Therefore, the fuel flowing through the heat exchanger is effectively cooled by the refrigerant without unduly large flow resistance and temperature rise of the fuel in the fuel tank can be prevented, whereby evaporation of the fuel is reduced. As a consequence, the canister can be miniaturized and leakage of the evaporated fuel into the atmosphere can be prevented. Moreover, vapor locking phenomenon can be prevented. In addition, since the heat transfer performance of the heat exchanger of the fuel cooling system of this invention is good, the fuel cooling system as a whole can be made compact.

While the preferred embodiments of the invention have been shown and described, it is to be understood that the disclosure is for the purpose of illustration and that various changes and modification may be made without departing from the scope of the invention set forth in the claims. For example, the tubes of the heat exchanger may not be of circular cross section.

What is claimed is:

1. A fuel cooling system for a motor vehicle which comprises a heat exchanger in line with a fuel return pipe for returning fuel from an engine to a fuel tank and in line with a refrigerant pipe through which passes a refrigerant: said heat exchanger including, an inner tube having a first end in communication with a first section of the refrigerant pipe and a second end in communication with a second section of the refrigerant pipe so as to define a longitudinal inner flow passage between said first and second inner tube ends;

an outer tube encompassing said inner tube so as to form an enclosed annular space which defines a longitudinal outer flow passage;

connecting means for connecting said enclosed annular space with the fuel return pipe, said connecting means including a first connecting member opening into said enclosed annular space and connected to a first section of the fuel return pipe and a second connecting member opening into said enclosed annular space and connected to a second section of the fuel return pipe, said second connecting member being positioned downstream in fuel flow direction to said first connecting member;

first heat transfer fin means secured in said inner flow passage, said first heat transfer fin means extending in said inner flow passage longitudinally thereof and being wave-shaped in a cross section taken perpendicuarly to a longitudinal axis of the inner flow passage so as to have a plurality of wave portions, said wave portions being arranged circumferentially within the inner flow passage so as to encircle a longitudinal axis of said inner tube; and second heat transfer fin means secured in said outer flow passage, said second heat transfer fin means comprising helical heat transfer fins disposed in said outer flow passage and extending radially outward from the inner tube and longitudinally along the outer flow passage.

2. A fuel cooling system as recited in claim 1, wherein said first transfer fin means has a number of openings formed therein.

3. A fuel cooling system as recited in claim 1 wherein said helical heat transfer fins extend radially between and into contact with an exterior surface of said inner tube and an interior surface of said outer tube.

* * * * *